United States Patent [19]
Watarai

[11] Patent Number: 5,848,555
[45] Date of Patent: Dec. 15, 1998

[54] AUXILIARY SHIFT LEVER FOR USE WITH A BICYCLE SHIFTING DEVICE

[75] Inventor: Etsuyoshi Watarai, Izumi, Japan

[73] Assignee: Shimano, Inc., Osaka, Japan

[21] Appl. No.: 666,785

[22] Filed: Jun. 19, 1996

[30] Foreign Application Priority Data

Jun. 23, 1995 [JP] Japan ................................ 7-181058

[51] Int. Cl.⁶ ........................ B62K 23/06; G05G 11/00
[52] U.S. Cl. .................... 74/473.13; 74/480 R; 74/489; 74/544; 74/551.8
[58] Field of Search .................. 74/489, 502.2, 74/551.8, 479.01, 551.9, 480 R, 544, 546, 557, 473.13

[56] References Cited

U.S. PATENT DOCUMENTS

| | | | |
|---|---|---|---|
| 1,262,425 | 4/1918 | Young | 74/544 |
| 1,536,966 | 5/1925 | O'Leary | 74/544 |
| 4,084,449 | 4/1978 | Kine | 74/480 R |
| 4,304,145 | 12/1981 | Shimano | 74/480 R |
| 4,658,667 | 4/1987 | Schuller | 74/502.2 X |
| 5,012,692 | 5/1991 | Nagano | 74/489 X |
| 5,299,466 | 4/1994 | Heilbron et al. | 74/502.2 |
| 5,361,645 | 11/1994 | Feng et al. | 74/502.2 |

*Primary Examiner*—Richard M. Lorence
*Assistant Examiner*—Troy Grabow
*Attorney, Agent, or Firm*—James A. Deland

[57] ABSTRACT

An auxiliary shift lever assembly for use with a bicycle shift device includes a support for supporting the auxiliary shift lever on the bicycle, an auxiliary shift lever body pivotably coupled to the support, one or more lever engaging parts disposed on the auxiliary shift lever body for contacting corresponding shift levers of the shift device, and one or more operating parts disposed on the auxiliary shift lever body. The operating parts are typically disposed at one or more remote locations and are structured to be manipulated by a user for pivoting the auxiliary shift lever body. This, in turn, causes the lever engaging parts to rotate the corresponding shift levers of the shift device.

35 Claims, 3 Drawing Sheets

AUXILIARY SHIFT LEVER FOR USE WITH A BICYCLE SHIFTING DEVICE

BACKGROUND OF THE INVENTION

The present invention is directed to bicycle shift control devices and, more particularly, to a bicycle shift control device which allows the cyclist to operate the shifter from a remote location.

Bicycle transmissions are usually operated by a shift control device which is coupled to the transmission by a control wire. The shift control device ordinarily has one or more levers which the cyclist pushes and/or pulls to shift the transmission. The levers are frequently mounted on the handlebars so that the levers are located close to the cyclist's hands. However cyclists ordinarily do not maintain their hands in a single position at all times. Usually, the cyclist frequently changes his or her hand position depending upon road conditions and the type of riding the cyclist is performing at the time. For example, the cyclist may hold the handlebars near the handlebar stem during casual rising and then hold the handlebars at the extreme ends for rough riding. Thus, the cyclist's hands are not always positioned close to the shift control device. Since it is not usually feasible to mount multiple shift control devices on the handlebars, the cyclist must alter his or her hand position to operate the shift control device whenever the cyclist's hands are not located at the proper position relative to the shift control device. During rough or competitive riding this can be very inconvenient.

SUMMARY OF THE INVENTION

The present invention is directed to a shift control device having an auxiliary shift lever which extends to various locations on the bicycle to facilitate shifting when the cyclist's hands are located in different positions. In one embodiment of the present invention used with a shift device having one or more shift levers, an auxiliary shift lever apparatus includes a support for supporting the apparatus on the bicycle, an auxiliary shift lever pivotably coupled to the support, one or more lever engaging parts disposed on the auxiliary shift lever for contacting corresponding shift levers of the shift device, and one or more operating parts disposed on the auxiliary shift lever. The operating parts are typically disposed at one or more remote locations and are structured to be manipulated by a user for pivoting the auxiliary shift lever. This, in turn, causes the lever engaging parts to rotate the corresponding shift levers of the shift device.

DETAILED DESCRIPTION OF THE EMBODIMENTS

Figure 1:
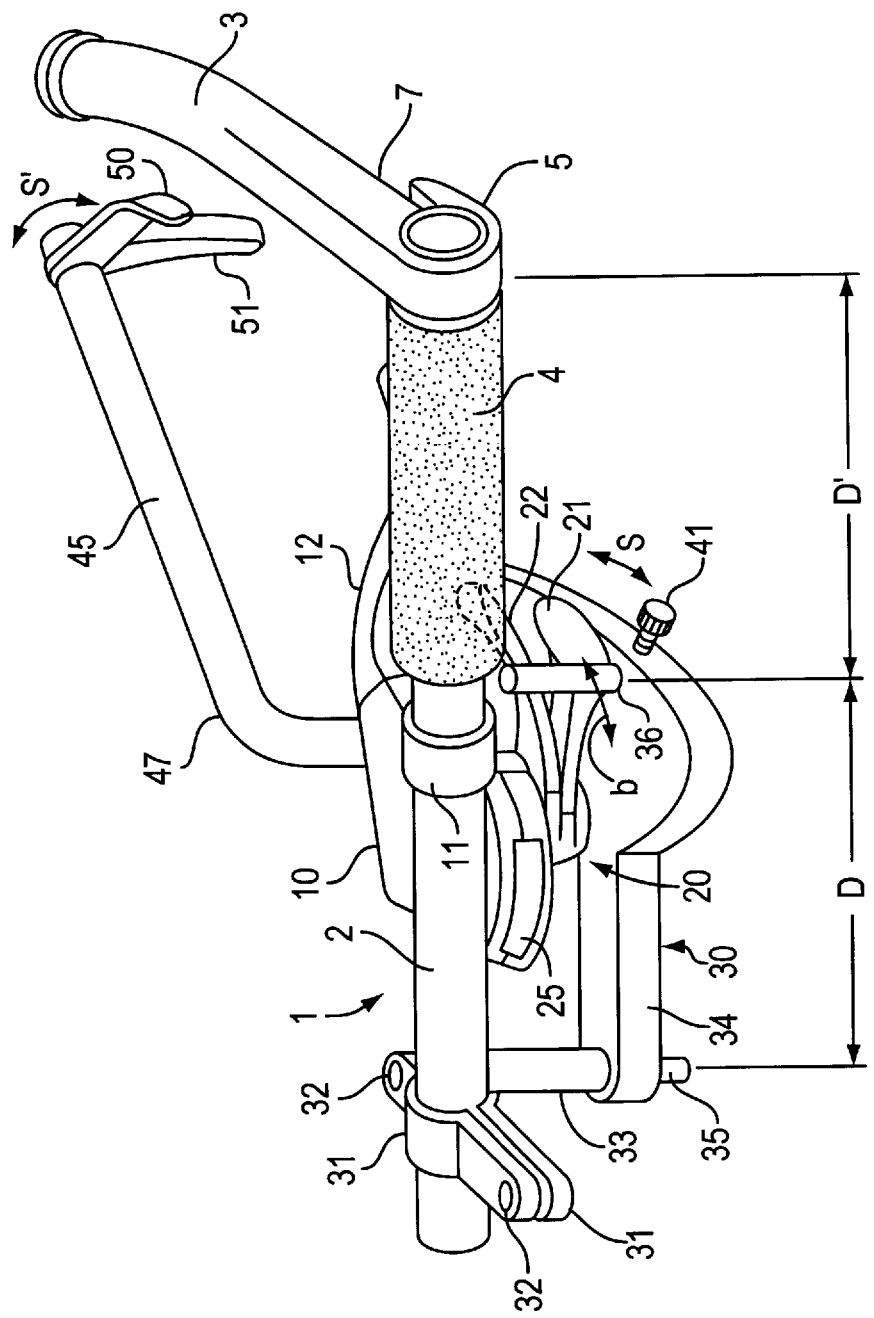
FIG. 1 is a perspective view of a particular embodiment of a bicycle shift control device according to the present invention.
Figure 2:
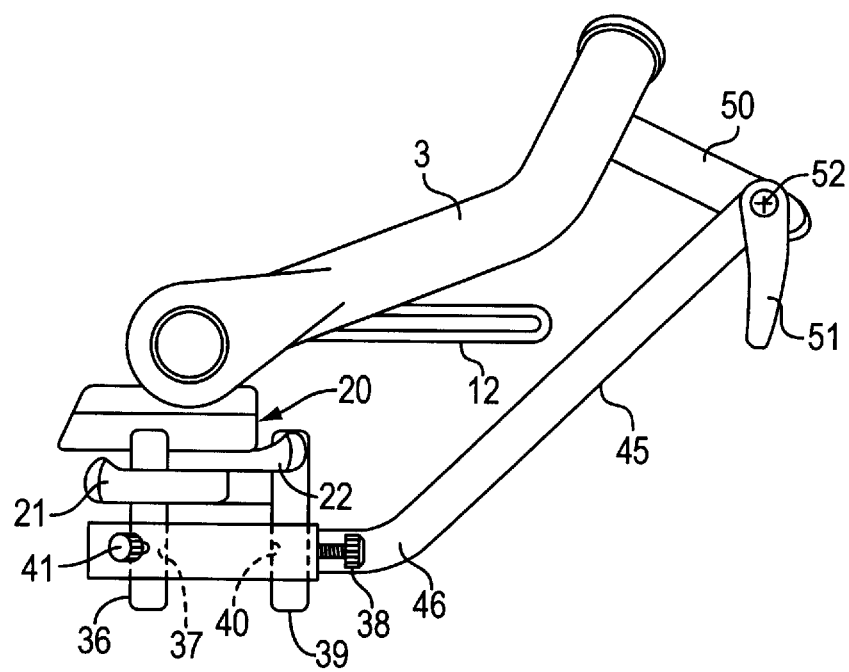
FIG. 2 is a right side view of the shift control device shown in FIG. 1.
Figure 3:
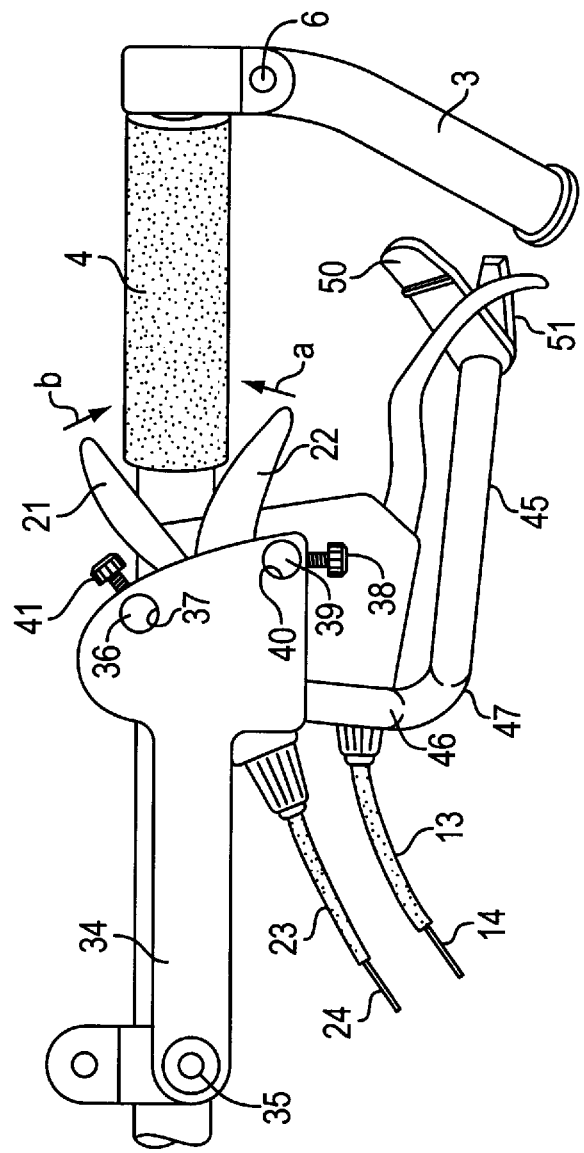
FIG. 3 is a bottom view of the shift control device shown in FIG. 1.

As shown in FIGS. 1–3, a handle bar 1 has a horizontal part 2 which is formed from a metal pipe, a grip 3 is fastened to one end of horizontal part 2 so that grip 3 is more or less perpendicular to horizontal part 2, and a grip 4 which is formed from rubber, polyvinyl chloride (PVC) or a thermoplastic elastomer (TPE), etc., is secured over the end portion of the horizontal part 2. An attachment band 5 is formed on one end of grip 3 for fastening grip 3 to one end of horizontal part 2. More specifically, a gap 7 of attachment band 5 is caused to arrow by tuning a clamp bolt 6 for fastening second grip 3 to horizontal part 2.

A brake bracket 10 is fastened to horizontal part 2 by an attachment band 11. In this embodiment, brake bracket 10 and attachment band 11 are formed as an integral unit. A brake lever 12 is installed on the brake bracket 10 so that brake lever 12 is free to pivot about a shaft. Brake lever 12 pulls the inner cable 14 of a brake wire 13 to operate a pulling brake (not shown in the figures). The internal structure of brake bracket 10 is well known, so a detailed description of this structure is omitted.

A shifter 20 is attached to brake bracket 10 by a bolt (not shown in the figures) so that shifter 20 can be freely detached. In this embodiment, shifter 20 is equipped with a main lever 21 and a trigger lever 22. Main lever 21 rotates in the direction b for pulling the inner cable 24 of a rear derailleur wire 23 during upshifting, and trigger lever 22 rotates in the direction a (FIG. 3) for releasing the inner cable 24 during downshifting. The internal structure of shifter 20 is well known, so, a detailed description of it is omitted. An indicator 25 of the shifter 20 is used to indicate the shift position of the derailleur to the rider.

When the rider grips the handle bar 1 at the position of first grip 4, the main lever 21 and trigger lever 22 can be directly operated in the ordinary manner. However, when the rider grips the handle bar 1 at the position of the grip 3, an auxiliary lever 30 is operated in order to operate the main lever 21 and trigger lever 22. More specifically, attachment members 31, 31 are fastened to the horizontal part 2 of the handle bar 1 by two bolts 32, and a fastening shaft 33 is formed as an integral part of one of the attachment members 31. One end of a first auxiliary lever body 34 is pivotably coupled to the lower end of the fastening shaft through a shaft 35.

The first auxiliary lever body 34 is formed from a roughly T-shaped plate material. A rod-form first engaging part 36 is inserted into a hole 37 formed in the first auxiliary lever body 34, and it is fastened to the first auxiliary lever body 34 by a bolt 41. The first engaging part 36 is structured for contacting the main lever 21. Similarly, a rod-form second engaging part 39 is inserted into a hole 40 formed in the first auxiliary lever body 34, and it is fastened to the first auxiliary lever body 34 by a bolt 38. The second engaging part 39 contacts the trigger lever 22.

Upshifting operations can be performed by pivoting the first auxiliary lever body 34 about the shaft 35 so that first engaging part 36 pushes against the side surface of the main lever 21. This, in turn, causes a ratchet/pawl mechanism (not shown) inside the shifter to pull the inner cable 24 of the derailleur cable 23. Downshifting operations can be performed by pivoting the first auxiliary lever body 34 about the shaft 35 so that the second engaging part 39 pushes against the side surface of the trigger lever 22. This, in turn, causes a positioning pawl (not shown) in the ratchet/pawl mechanism to release the inner cable 24.

One end of a second auxiliary lever body 45 which is formed from a pipe is fastened to the side surface of the first auxiliary lever body 34. The second auxiliary lever body 45 is bent to form two bent portions 46 and 47, so that the tip end of the second auxiliary lever body 45 is positioned near second grip 3. A first operating lever 50 and a second operating lever 51 which is perpendicular to the first operating lever 50 are installed at the free end of the second auxiliary lever body 45 by a bolt 52. Upshifting of the derailleur is accomplished mainly by pushing the first operating lever 50 so that the main lever 21 is pushed, whereas downshifting is accomplished by pulling second operating lever 51 so that trigger lever 22 is pulled.

The shaft 35 of the first auxiliary lever body 34 is located at a relatively long distance D from the first engaging part 36 and second engaging part 39, and it is located near the pivoting center of the main lever 21 and trigger lever 22. As a result, the amount of operation S' required in order to operate the shifter by means of the first operating lever 50 and second operating lever 51 does not differ greatly from the amount of operation S required in the case of direct operation.

While the above is a description of various embodiments of the present invention, further modifications may be employed without departing from the spirit and scope of the present invention. For example, in the embodiment described above, the present invention was applied to a shifter which had a main lever and a trigger lever. However, it would also be possible to apply the present invention to a shifter equipped with only a main lever wherein the inner cable of the derailleur wire is wound around a winding drum. In such a case, the main lever is positioned at the desired location on the bicycle, and the main lever may be clamped between the first and second engaging parts, or may be fastened to one of the engaging parts. Operation of the auxiliary lever then moves the main lever accordingly. The shifter described above was a derailleur type shifter, but of course the present invention may similarly be applied to a hub gear shifter in which shifting is performed with a hub gear. Since a hub gear shifter has a single lever, the auxiliary lever may be constructed as discussed above for the single main lever embodiment.

Furthermore, the pivoting shaft of the auxiliary lever in the described embodiment was installed on the handle bar in order to insure that the amount of operation required at the position of the grip 3 was substantially the same as the amount of operation required at the position of the grip 4. However, if some increase in the amount of operation required is acceptable, it would also be possible to install the pivoting shaft of the auxiliary lever on the brake bracket 10 or on the shifter 20. While the shifter was installed on the handle bar 1, it would also be possible to install the shifter on some other part of the bicycle frame. The operating parts need not be levers and may be merely portions of the auxiliary lever which lend themselves to manipulation by the user.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A shift lever apparatus for a bicycle comprising:
   a shifter (20) including a shift lever (21,22);
   a support (31,32,33) for supporting the apparatus on the bicycle;
   an auxiliary shift lever (34,45) pivotably coupled to the support (31,32,33);
   a lever engaging part (36,39) disposed on the auxiliary shift lever (34,45) for contacting the shift lever (21,22) to cause the shift lever (21,22) to perform the shifting operation;
   an operating part (50,51) disposed on the auxiliary shift lever (34,45), the operating part (50,51) being structured to be manipulated by a user for pivoting the auxiliary shift lever (34,45); and
   wherein the support (31,32,33) comprises:
      a bracket (31) structured to attach to a structural member of the bicycle; and
      a fastening member (33) extending from the bracket (31), the fastening member (33) having one end fixed to the bracket (31) and another end coupled to the auxiliary shift lever (34,45).

2. The apparatus according to claim 1 wherein the fastening member (33) comprises an elongated shaft.

3. The apparatus according to claim 2 wherein the shaft is coupled substantially perpendicularly to the auxiliary shift lever (34,45).

4. The apparatus according to claim 1 wherein the lever engaging part (36,39) comprises an elongated member extending from a side of the auxiliary shift lever (34,45).

5. The apparatus according to claim 1 wherein the operating part (50,51) comprises a finger lever.

6. The apparatus according to claim 5 wherein the finger lever extends substantially perpendicularly from a free end of the auxiliary shift lever (34,45).

7. A shift lever apparatus for a bicycle comprising:
   a shifter (20) including a shift lever (21,22);
   a support (31,32,33) for supporting the apparatus on the bicycle;
   an auxiliary shift lever (34,45) pivotably coupled to the support (31,32,33);
   a lever engaging part (36,39) disposed on the auxiliary shift lever (34,45) for contacting the shift lever (21,22) to cause the shift lever (21,22) to perform the shifting operation;
   an operating part (50,51) disposed on the auxiliary shift lever (34,45), the operating part (50,51) being structured to be manipulated by a user for pivoting the auxiliary shift lever (34,45); and
   wherein the operating part (50,51) comprises:
      a first finger lever (50) extending substantially perpendicularly from a free end of the auxiliary shift lever (34,45); and
      a second finger lever (51) extending substantially perpendicularly from the free end of the auxiliary shift lever (34,45), the second finger lever (51) being substantially perpendicular to the first finger lever (50).

8. A shift lever apparatus for a bicycle comprising:
   a shifter (20) including a first shift lever (21) for pulling a control cable (24) and a second shift lever (22) for releasing the control cable (24);
   a support (31,32,33) for supporting the apparatus on the bicycle;
   an auxiliary shift lever (34,45) pivotably coupled to the support (31,32,33);
   a first lever engaging part (36) disposed on the auxiliary shift lever (34,45) for contacting the first shift lever (21);
   a second lever engaging part (39) disposed on the auxiliary shift lever (34,45) for contacting the second shift lever (22); and
   an operating part (50,51) disposed on the auxiliary shift lever (34,45), the operating part (50,51) being structured to be manipulated by a user for pivoting the auxiliary shift lever (34,45).

9. The apparatus according to claim 8 wherein the support (31,32,33) comprises:
   a bracket (31) structured to attach to a structural member of the bicycle; and
   a fastening member (33) extending from the bracket (31), the fastening member (33) having one end fixed to the bracket (31) and another end coupled to the auxiliary shift lever (34,45).

10. The apparatus according to claim 9 wherein the fastening member (33) comprises an elongated shaft.

11. The apparatus according to claim 10 wherein the shaft is coupled substantially perpendicularly to the auxiliary shift lever (34,45).

12. The apparatus according to claim 8 wherein the first lever engaging part (36) comprises a first elongated member extending from a side of the auxiliary shift lever (34,45), and wherein the second lever engaging part comprises a second elongated member extending from the side of the auxiliary shift lever (34,45).

13. The apparatus according to claim 8 wherein the operating part (50,51) comprises a first finger lever.

14. The apparatus according to claim 13 wherein the first finger lever extends substantially perpendicularly from a free end of the auxiliary shift lever (34,45).

15. The apparatus according to claim 8 wherein the operating part (50,51) comprises:
   a first finger lever (50) extending substantially perpendicularly from a free end of the auxiliary shift lever (34,45); and
   a second finger lever (51) extending substantially perpendicularly from the free end of the auxiliary shift lever (34,45), the second finger lever (51) being substantially perpendicular to the first finger lever (50).

16. The apparatus according to claim 13 wherein the operating part (50,51) comprises a second finger lever.

17. The apparatus according to claim 14 wherein the second finger lever extends substantially perpendicularly from the free end of the auxiliary shift lever (34,45).

18. A shifting apparatus for a bicycle comprising:
   a shifter (20) including a first shift lever (21) and a second shift lever (22);
   a support (31,32,33) fixed to the handlebar (1);
   an auxiliary shift lever (34,45) pivotably coupled to the support (31,32,33);
   a first lever engaging part (36) extending from a side of the auxiliary shift lever (34,45) for contacting the first shift lever (21);
   a second lever engaging part (39) extending from the side of the auxiliary shift lever (34,35) for contacting the second shift lever (22); and
   a first finger lever (50) disposed on the auxiliary shift lever (34,45), the first finger lever (50) being structured to be manipulated by a user for pivoting the auxiliary shift lever (34,45).

19. The apparatus according to claim 18 wherein the first shift lever (21) and the second shift lever (22) are disposed between the first lever engaging part (36) and the second lever engaging part (39).

20. The apparatus according to claim 18 further comprising:
   a fastening member (33) extending from the bracket (31), the fastening member (33) having one end fixed to the bracket (31) and another end coupled to the auxiliary shift lever (34,45); and
   wherein a portion (34) of the auxiliary shift lever (34,45) extends substantially parallel to the handlebar (1).

21. The apparatus according to claim 20 further comprising a second finger lever (51) extending substantially perpendicularly from the free end of the auxiliary shift lever (34,45), the second finger lever (51) being substantially perpendicular to the first finger lever (50).

22. An auxiliary shift lever apparatus for use with a shifter (20) installed on a bicycle, the shifter (20) including a shift lever (21,22) to perform shifting operations, the apparatus comprising:
   a support (31,32,33) for supporting the apparatus on the bicycle;
   an auxiliary shift lever (34,45) pivotably coupled to the support (31,32,33);
   a lever engaging part (36,39) disposed on the auxiliary shift lever (34,45);
   an operating part (50,51) disposed on the auxiliary shift lever (34,45), the operating part (50,51) being structured to be manipulated by a user for pivoting the auxiliary shift lever (34,45);
   wherein the operating part (50,51) comprises:
      a first finger lever (50) extending from a free end of the auxiliary shift lever (34,45); and
      a second finger lever (51) extending from the free end of the auxiliary shift lever (34,45).

23. The apparatus according to claim 22 wherein the first finger lever (50) extends substantially perpendicularly from a free end of the auxiliary shift lever (34,45).

24. The apparatus according to claim 23 wherein the second finger lever (51) extends substantially perpendicularly from the free end of the auxiliary shift lever (34,45).

25. The apparatus according to claim 24 wherein the second finger lever (51) is substantially perpendicular to the first finger lever (50).

26. An auxiliary shift lever apparatus for use with a shifter (20) installed on a bicycle, the shifter including a first shift lever (21) for pulling a control cable (24) and a second shift lever (22) for releasing the control cable (24), the apparatus comprising:
   a support (31,32,33) for supporting the apparatus on the bicycle;
   an auxiliary shift lever (34,45) pivotably coupled to the support (31,32,33);
   a first lever engaging part (36) disposed on the auxiliary shift lever (34,45);
   a second lever engaging part (39) disposed on the auxiliary shift lever (34,45); and
   an operating part (50,51) disposed on the auxiliary shift lever (34,45), the operating part (50,51) being structured to be manipulated by a user for pivoting the auxiliary shift lever (34,45).

27. The apparatus according to claim 26 wherein the support (31,32,33) comprises:
   a bracket (31) structured to attach to a structural member of the bicycle; and
   a fastening member (33) extending from the bracket (31), the fastening member (33) having one end fixed to the bracket (31) and another end coupled to the auxiliary shift lever (34,45).

28. The apparatus according to claim 27 wherein the fastening member (33) comprises an elongated shaft.

29. The apparatus according to claim 28 wherein the shaft is coupled substantially perpendicularly to the auxiliary shift lever (34,45).

30. The apparatus according to claim 26 wherein the first lever engaging part (36) comprises a first elongated member extending from a side of the auxiliary shift lever (34,45), and wherein the second lever engaging part comprises a second elongated member extending from the side of the auxiliary shift lever (34,45).

31. The apparatus according to claim 26 wherein the operating part (50,51) comprises a first finger lever.

32. The apparatus according to claim 31 wherein the operating part (50,51) comprises a second finger lever.

33. The apparatus according to claim 31 wherein the first finger lever extends substantially perpendicularly from a free end of the auxiliary shift lever (34,45).

34. The apparatus according to claim 33 wherein the operating part (50,51) comprises a second finger lever, and wherein the second finger lever extends substantially perpendicularly from a free end of the auxiliary shift lever (34,45).

35. The apparatus according to claim 26 wherein the operating part (50,51) comprises:
   a first finger lever (50) extending substantially perpendicularly from a free end of the auxiliary shift lever (34,45); and
   a second finger lever (51) extending substantially perpendicularly from the free end of the auxiliary shift lever (34,45), the second finger lever (51) being substantially perpendicular to the first finger lever (50).

* * * * *